No. 719,329. PATENTED JAN. 27, 1903.
J. C. HAINES.
VEHICLE TIRE FASTENER.
APPLICATION FILED MAY 19, 1902.
NO MODEL.
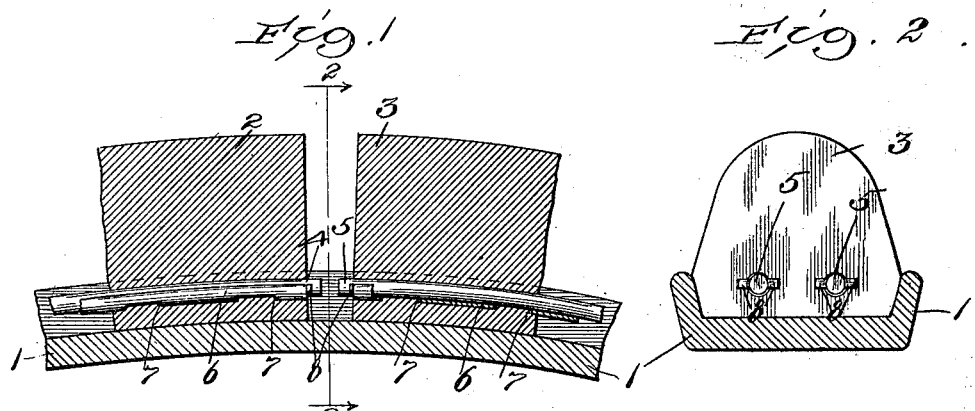
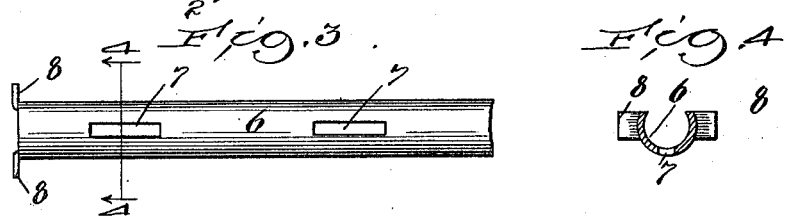
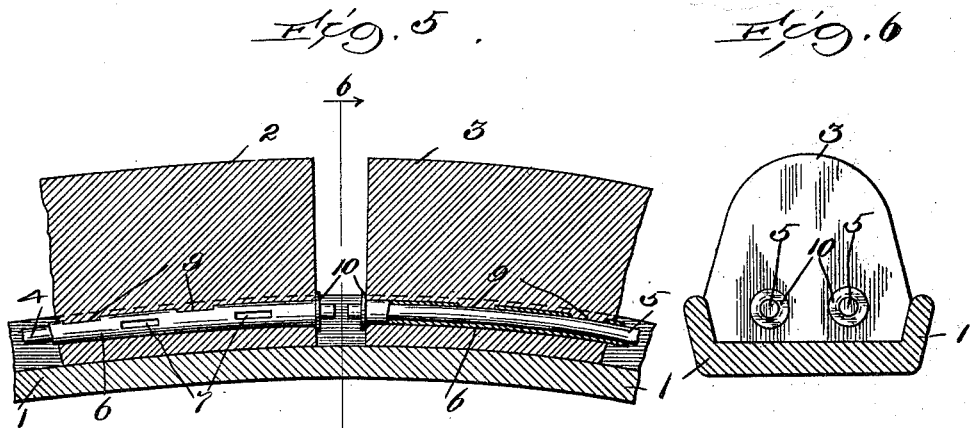
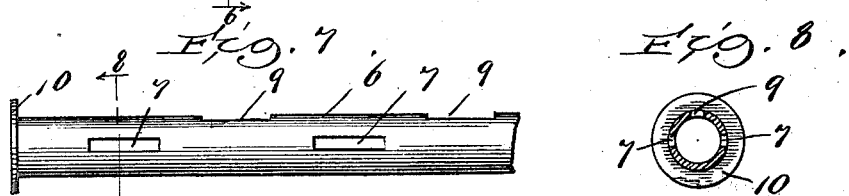
Witnesses:
Ray White
Harry C. Carlisle
Inventor:
Jacques C. Haines
By Jose Bain Atty

UNITED STATES PATENT OFFICE.

JACQUES C. HAINES, OF CHICAGO, ILLINOIS, ASSIGNOR OF TWO-THIRDS TO WILLIAM E. HUBER AND CHESTER HAINES, OF CHICAGO, ILLINOIS.

VEHICLE-TIRE FASTENER.

SPECIFICATION forming part of Letters Patent No. 719,329, dated January 27, 1903.

Application filed May 19, 1902. Serial No. 107,918. (No model.)

*To all whom it may concern:*

Be it known that I, JACQUES C. HAINES, of Chicago, in the county of Cook and State of Illinois, have invented certain new and useful Improvements in Vehicle-Tire Fasteners; and I hereby declare that the following is a full, clear, and exact description thereof, reference being had to the accompanying drawings, which form part of this specification.

My invention relates to improvements in vehicle-tire fasteners for securing the vehicle-tire on the wheel.

The object of my invention is to provide a means for protecting the tire at the point where the attaching-wires are joined and for reinforcing the tire at the point where the joint is made.

With these and other objects in view, which may become apparent to those skilled in the art, my invention consists in the features, arrangements, and combinations of parts to be hereinafter described, and particularly pointed out in the appended claim.

In the drawings, Figure 1 is a broken-away rim and tire of a wheel shown in section with the retaining-wire in place prior to joining it by welding or brazing, showing my reinforcing-bushing for protecting the tire at the joint in position in the tire. Fig. 2 is a section of the rim, taken on lines 2 2 of Fig. 1. Fig. 3 is an enlarged broken-away perspective view of one of the metallic reinforcing-grooves adapted to slip into the end of the tire at points on either side where the joint in the retaining-wires is to be made. Fig. 4 is a section of the same through line 4 4 of Fig. 5. Fig. 5 is a similar view to Fig. 1, showing a modification of my tire-protecting device. Fig. 6 is a view similar to Fig. 2, taken on lines 6 6 of Fig. 5. Fig. 7 is a perspective broken-away view of a modified form of my protecting device. Fig. 8 is a section through lines 8 8 of Fig. 7.

In all of the views the same numerals indicate similar parts.

1 is the grooved rim of an ordinary vehicle-wheel. 2 and 3 are the respective ends of the rubber tire, adapted to surround the same.

4 and 5 are the respective ends of the retaining-wire designed to be brazed, welded, or otherwise fastened together for the purpose of retaining the tire in position on the rim.

6 6 represent a grooved metallic reinforcing-bushing piece adapted to partially inclose the retaining-wire over the joint. It is provided with openings 7 7 in the side and with wings 8 8 on one end. These wings are adapted to hold the bushing in position and prevent it from passing too far into the orifices made in the tire.

The modified device shown in Fig. 7 is similar to that shown in Fig. 3, with the exception that the bushing is a completed tube having additional orifices 9 9 made into its top surface, and instead of the wings 8 8 it is provided with a continuous flange 10.

When the ends 4 and 5 of the wire are soldered, welded, or otherwise fastened together, the temper of the wire is usually drawn at the point where the joint is made, and the wires do not preserve the normal annular form of the other portion of the hoop composed of the wire. It is therefore very difficult to slide the ends 2 and 3 of the tire back over the part of the wire containing the joint, and in doing so it frequently strains the ends of the tire at the point where the perforation for the retaining-wire is made. The object of my device is to provide a means for reinforcing the tire so as to distribute this strain by the use of the reinforcing-bushings over a larger surface of the tire. In making the joint the retaining-wires are placed in the tire as usual after the reinforcing, tubular, or grooved bushings 6 have first been placed in the perforations at the ends of the tire. They are pressed into the tire until wings 8 8 or flange 10 come flush with the ends thereof, when the rubber, of which the tire is composed, will enter the openings 7 and 9 and hold the pieces in position and the wings 8 and the flange 10 will prevent the protecting devices from entering into the tire too far. The wings or flanges will hold the device in the position shown in Figs. 1 and 5, and by distributing the strain that would otherwise come directly at the terminals of the perforations made for the retaining-wires the liability of splitting or otherwise injuring the tire at this point is entirely obviated. At the time when the joint is to be made the ends 2 and 3 of the tire are pressed back from the ends 4 and 5 of the retaining-wires a much greater distance than that shown in Fig. 1, and the joint is made by the usual process, at which time the ends of the tires are pressed together again, where the protecting devices will follow the ends of the tires, permitting the closing of the gap and facilitate the movement of the ends of the tire to their proper position. The retaining-wires being made weaker by the joint as a result of drawing the temper and from the fact that the joint is never so strong as the other parts of the wire, my device serves to reinforce the retaining-wires and the tire both at this point in addition to performing the functions that I have just described.

My invention contemplates the use of small short reinforcing-sections within the tire-perforation throughout the entire length thereof, with intervening spaces between such sections to permit elastic movement of the tire.

Other forms than those shown in the drawings may be used for the purpose described without departing from the spirit and scope of my invention.

Having described my invention, what I claim as new and useful, and desire to secure by Letters Patent of the United States, is—

The combination with a laterally-divided rubber vehicle-tire having a circumferential perforation, of a retaining-wire therein joined at its ends, and a pair of separator, reinforcing-bushings 6, surrounding the joint, each bushing comprising a sheet-metal cylindrical structure of uniform size throughout its length, provided at one end with a laterally-projecting flange adapted to bear against one of the severed ends of the tire, and also provided with a series of longitudinally-extended perforations spaced throughout its length and adapted to receive protruding portions of the surrounding tire, substantially as set forth.

In testimony that I claim the foregoing as my own I affix my signature in presence of two witnesses.

JACQUES C. HAINES.

In presence of—
FORÉE BAIN,
MARY F. ALLEN.